P. T. SUNDBERG.
CENTRIFUGAL SEPARATOR FOR MILK AND OTHER FLUIDS.
APPLICATION FILED FEB. 7, 1910.
994,485.
Patented June 6, 1911.
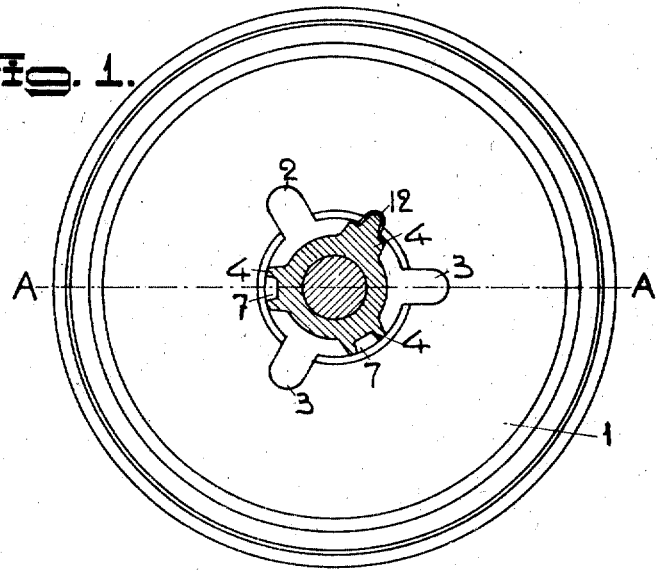
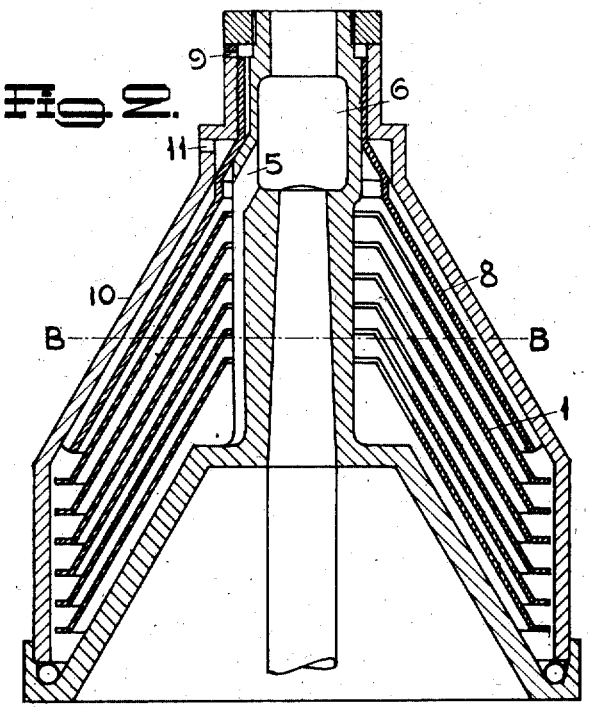
Witnesses
J. Rabinowitz
E. Schallinger
Inventor
Per Teodor Sundberg
By B. Singer
Atty

UNITED STATES PATENT OFFICE.

PER TEODOR SUNDBERG, OF STOCKHOLM, SWEDEN, ASSIGNOR TO AKTIEBOLAGET EXPRESS SEPARATOR EMIL G. LIND & CO., OF STOCKHOLM, SWEDEN.

CENTRIFUGAL SEPARATOR FOR MILK AND OTHER FLUIDS.

994,485.  Specification of Letters Patent.  Patented June 6, 1911.

Application filed February 7, 1910. Serial No. 542,551.

*To all whom it may concern:*

Be it known that I, PER TEODOR SUNDBERG, a subject of the King of Sweden, residing at Norrtullsgatan 24, in Stockholm, Sweden, have invented a new and useful Centrifugal Cream-Separator, of which the following is a specification.

My invention relates to improvements in centrifugal separators for milk and other fluids and it refers especially to that kind of separators where the bowl has a tubular shaft or center with longitudinal ribs and ports in said ribs through which the whole milk is fed, and a liner of superimposed conical plates passed on said shaft and provided with slots in their inner edge so as to form vertical channels. And the object of my invention is to facilitate the separation and to render it as perfect and quick as possible and to attain such result with a simple, cheap and durable construction of the apparatus.

Heretofore the liner had such a position on the shaft that the ribs entered the slots in the plates and filled them either totally or partly. The latter form is shown in my previous Patent No. 847,524. I have now found that it is better to arrange the liner in such a position that the ribs do not enter the slots and even do not lie in the same radial vertical plane as the channels formed by said slots but alternate with them. I do not pretend to be able to fully account for why this new arrangement must give a better result, but it may be supposed that the vertical channels when left free and not partly or totally filled up by the ribs or by the whole milk rushing down from the radial port formed in upper part of the ribs, will essentially facilitate the inward and upward movement of the separated cream and at the same time an even and uniform distribution of the whole milk upon the liner, especially if the ribs be provided with a longitudinal groove on their edge in front of the inner edge of the plates so that the milk when leaving the port can flow down into said groove and be partly distributed therefrom into the spaces between the plates while the part of the whole milk which reaches the bottom of the bowl can by flowing along the bottom reach the vertical channels in the liner and rise into them so as to be distributed into said spaces from these channels.

On the accompanying drawing which shows the preferred form of my new machine Figure 1 is a horizontal section on line B—B, Fig. 2, after removal of the nut, cover 10 and cover plate 8. Fig. 2 is a vertical section on line A—A, Fig. 1.

1 is the conical plates with slots 2 at their inner edge. These slots lie above one another so that vertical channels 3 are formed in the liner. The vertical ribs 4 on the shaft or center are placed between said channels 3 and two of them have each a longitudinal groove 7 on their edge extending from bottom of the bowl to the port 5 formed in upper part of the ribs and serving as a communication between the central feeding chamber 6 and the bowl.

The ribs 4 reach the inner edge of the plates and serve as guides for the latter. The third rib has no groove but a smaller rib 12 on its edge, entering a corresponding notch or small slot in the plates, so as to render it impossible to pass the plates on the tubular shaft in a wrong mutual position.

8 is the cover plate, 9 is the outlet for cream, 10 is the cover and 11 the outlet for skim milk.

As well known the skim milk, being the heavier part of the milk, is forced to the periphery of the bowl, where it rises outside of the cover plate between this and the cover and thus reaches the outlet 11, while the separated cream as the lighter element is driven inward to the shaft, where it rises between the ribs and inside the neck of the cover plate so as to reach the outlet 9.

As already stated the construction now described gives a very good result. One of the advantages with my new machine consists therein that the cream will not stick and accumulate on the edge of the ribs. The vertical channels formed on the ribs will thus remain open and are not liable to be choked by accumulated cream. And when the separation is done and the bowl opened and the liner removed the ribs will be found clean or nearly so and not covered with an adherent layer of cream as in some of the constructions used heretofore.

What I claim as new and desire to secure by Letters Patent is:

In a centrifugal separator the combination of a tubular feeding shaft, a plurality of ribs axially disposed on the circumference of the shaft, the ribs being provided with grooves opening in radial direction on the entire length thereof, a plurality of conical superposed plates provided with slots, and being disposed so that the slots of said plates register with each other in axial direction, each of said plates being provided with an additional notch, and a straight rib mounted on said shaft, said rib entering the notches of said plates.

In testimony whereof I have signed my name to this specification in the presence of two subscribing witnesses.

PER TEODOR SUNDBERG.

Witnesses:
L. ROMELL,
H. MELINDER.